UNITED STATES PATENT OFFICE 2,420,629

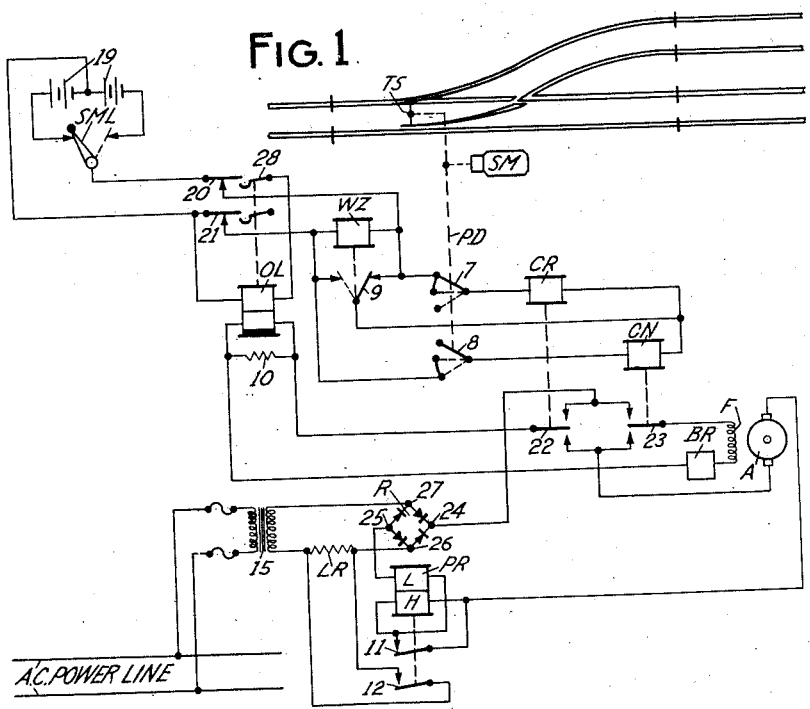
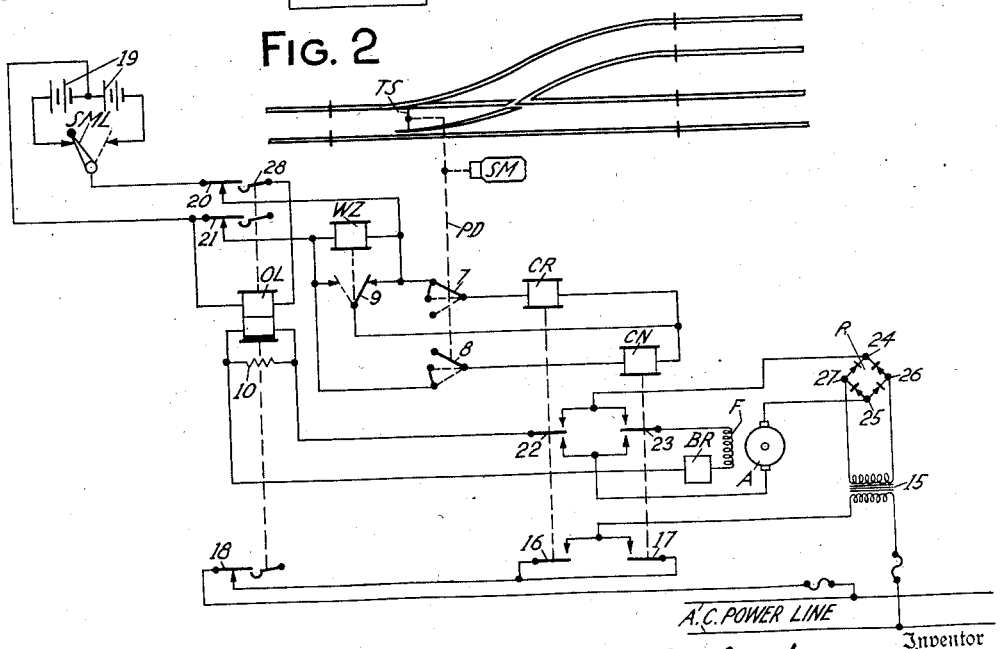

POWER SUPPLY FOR TRAFFIC CONTROLLING SYSTEMS

Charles L. Swanton, North Chili, N. Y., assignor to General Railway Signal Company, Rochester, N. Y.

Application September 28, 1944, Serial No. 556,172

7 Claims. (Cl. 171—97)

This invention relates to traffic controlling systems for railroads, and more particularly pertains to the power supply for intermittently operated traffic controlling devices used in such systems.

In some traffic controlling systems, there are traffic controlling devices which are manually governed from a central office, such as switch machines, signals and the like; and it is desirable to control such devices by direct wire or code type communication systems using a minimum amount of power to effect such control, while supplying power locally for the operation of the devices. As is well understood, it is more convenient and efficient to transmit power by alternating current as relatively high potentials and then employ transformers to reduce such potential for the operation of the different devices to be supplied with power. On the other hand, many devices, such as switch machines that have electromagnetic brakes may be operated more efficiently and the associated brakes caused to be released more accurately at predetermined values of energization if direct current is employed.

In view of the above considerations, it is proposed in accordance with the present invention, that power shall be transmitted to the various individual units of a traffic controlling system by the use of alternating current supply lines, and then employ transformers for suitably reducing the potential for the input of suitable rectifiers of the copper oxide or selenium dry plate type, or the like, for rectifying the alternating current for supplying direct current to the devices to be operated. Since such devices are only intermittently operated and require the supply of power for only short periods of time during such operation, such as from 3 to 10 seconds for example, it will be appreciated that such a condition provides a different problem than as if power were required continuously.

Rectifiers of the copper oxide or selenium dry plate type have a certain load rating at which they may be efficiently operated to continuously rectify alternating currents. This continuous load rating is limited by the heating effects present in such a rectifier, by the characteristics of the rectifier itself giving the greatest efficiency at particular load values, and further by the fact that the overloading of such rectifiers continuously causes an abnormal aging of the rectifier tending to increase the forward resistance of such rectifier and thus reducing its efficiency. However, it has been determined that such rectifiers may have what is called an intermittent load rating, that is, they may supply a relatively heavy load over short periods of time without materially overheating or without materially causing abnormal aging of the rectifier.

Thus, the present invention proposes to provide a rectifier organization having only an intermittent load rating sufficient to carry the load of the device to be intermittently operated together with the provision of suitable means for protecting against the application of a continuous load upon the rectifier. It can be seen that this is particularly desirable since the difference in size of a rectifier having a certain intermittent load rating and a rectifier having a continuous load rating equal to such intermittent load rating is approximately a ratio of 1 to 18. Thus, it can be seen that it is economic to provide for the supply of rectified energy through a rectifier having only an intermittent load rating for the device to be intermittently operated and yet at the same time provide an organization that gives adequate protection to the rectifier. Under such circumstances, it will also be appreciated that the decreased efficiency of operation of such rectifier is practically neglible since the amount of power supplied is relatively small over a period of time.

Furthermore, it should be understood that adequate protection for such an intermittent rated rectifier consists not only in the removal of the direct current load from its output terminals but also in the removal of the alternating current potential from across its input terminals. This is because a potential, which is much higher than the potential that may be applied across it for its continuous rating, must be applied to the input of the rectifier to give the temporary over-rated output, and if this relatively high potential were left across its input terminals continuously certain adverse conditions would be obtained. More specifically, the over-rated potential would cause an undue leakage current to flow, even though no direct current load were being supplied, due to the fact that the back resistance of such rectifiers is materially less when a high potential is applied. This would cause an unnecessary consumption of power over a period of time. Also, the continuous application of the over-rated potential would have a tendency to cause an unnecessary heating and aging of the rectifier, as well as rendering it subject to the possibility of break down in the copper oxide or selenium film between the plates.

Other objects, purposes and characteristic features of the present invention will be in part obvious from the accompanying drawings, and in part pointed out as the description of the invention progresses.

In describing the invention in detail, reference will be made to the accompanying drawings, in which like reference characters designate corresponding parts throughout the several views, and in which—

Fig. 1 represents in a diagrammatic manner one specific embodiment of the present invention as applied to the supply of power to an intermittently operated switch machine for a typical railroad track switch; and Fig. 2 represents in a diagrammatic manner a modified form of Fig. 1 accomplishing the purposes of the present invention by different means.

For the purpose of simplifying the illustration and facilitating in the explanation, the various parts and circuits constituting the embodiment of the present invention have been shown diagrammatically and certain conventional illlustrations have been employed, the drawings having been made more with the purpose of making is easy to understand the principles and mode of operation, than with the idea of illustrating the specific construction and arrangement of parts that would be employed in practice. Thus, the various relays and their contacts are illustrated in a conventional manner, and symbols are used to indicate the batteries, other sources of alternating current, transformers and other devices used in the embodiment of the present invention.

Although the present invention has been specifically applied to the supply of power to a switch machine for operating a railroad track switch, it is to be understood that the principles of the invention may be applied to the supply of direct current power for various other devices which are only intermittently operated. Insofar as the operation and control of the track switch and its switch machine are concerned, both Figs. 1 and 2 are the same, so that the general description will apply equally as well to one form as to the other. Thus, it will only be necessary to specifically refer to the different figures of the drawings when pointing out the distinctive features of the power supply organization embodying the present invention.

With reference to the accompanying drawings, a main track has been shown interconnecting with a diverging route by a track switch TS, which track switch is operated by a suitable switch machine SM to its normal and reverse positions as manually governed from a remote control office by a suitable manually operable lever SML. The power switch machine SM may be of any suitable type, such as that shown for example in the patent to W. K. Howe, Patent No. 1,466,903, dated September 4, 1923, with an electromagnetic brake applied thereto. This brake may be of any suitable type such as shown for example in the prior patent of W. K. Howe, Patent No. 1,852,574, dated April 5, 1932.

Associated with the switch machine SM are the usual point detector contacts PD which may be operated by any suitable type mechanism, such as shown in the prior patent to C. S. Bushnell, Patent No. 1,517,236, dated November 25, 1924. These point detector contacts PD include movable contacts which assume normal or reverse extreme positions in correspondence with the track switch TS when it is locked by the switch machine, and assume intermediate positions during operation of the track switch TS at all other times that it is unlocked. Although such a point detector mechanism includes various pole changing contacts and the like, it has been simplified by the illlustration of only the movable contact arms 7 and 8 which are indicated as being in normal full-line positions when the track switch TS is in a normal locked position, which assume intermediate positions when the track switch is unlocked or is being operated, and which assume opposite extreme dotted line positions when the track switch TS is in its reverse locked position.

The switch machine operating mechanism includes a motor having an armature A and field winding F together with the electromagnetic brake BR as above mentioned, which acts to hold the switch machine in its last operated position to prevent creeping of the armature and the accidental unlocking of the track switch except when a proper amount of power is placed upon the switch machine circuit to properly cause its operation.

The switch machine has associated therewith a remotely controlled relay WZ of the polarized two-position type having a contact 9 which assumes one position when the relay WZ is energized with one polarity and assumes the opposite position when such relay is energized with the opposite polarity with the further characteristic that it remains in the last position to which it is actuated even upon deenergization of the relay. This relay WZ is used in combination with the point detector contacts to control two contactors CN and CR which respectively govern the normal and reverse operation of the switch machine by controlling the power applied to the switch machine motor. These two contactors CN and CR are of the tractive electromagnetic type and preferably have their armatures interlocked so that only one contactor can close its front contacts at the same time, and so that the back contacts of either contactor can be closed only when the front contacts of the other contactor are closed. Such an organization has been disclosed for example in the prior patent to W. K. Howe et al., Patent No. 2,134,944, dated November 1, 1938.

Also, an overload relay CL is provided with a lower winding included in the operating circuit of the switch machine SM so that in event that the switch becomes stalled in mid-stroke and excessive energy flows in the operating circuit, that the contactor CN or CR will be deenergized and maintained deenergized until a manual control is exercised calling for the opposite operation of the track switch. This overload device OL is provided with an upper winding which is included in a stick circuit energized over the line circuit when the device is operated. Such an arrangement of overload control has been disclosed in the prior patent to A. L. Langdon et al., Patent No. 2,026,502, dated December 31, 1935. The resistor 10 is connected across the overload winding so as to by-pass such winding upon an initial surge of energy in the beginning of the operation of the switch machine. As the switch machine continues to operate, this resistance becomes more resistive and causes a greater amount of operating current to flow through the overload winding of this device OL so that if the load becomes excessive its contacts will be actuated. The overload device OL is also made slow acting by the usual short circuited windings.

The switch machine lever SML in the remote office, acts through a suitable line circuit to supply current of one polarity or the other to control the relay WZ and to also provide for the energization of the contactors CN and CR as will presently be described.

Although the present invention contemplates direct control with a manually operated lever, it is to be understood that remote control by means of a code type communication system may be employed, and in such a case relay contacts will be employed in place of the lever SML. Also, no attempt has been made to show automatic traffic controlled means to govern the operation of the switch machine, it being understood that these may be inserted in the control of the relay WZ as desired.

With reference to Fig. 1, an alternating current power line has the primary winding of transformer 15 connected to it through suitably fused connections, while the secondary winding of this transformer 15 is connected through a limiting resistor LR to the input terminals 26 and 27 of a rectifier unit R. This rectifier unit R is of the full-wave bridge type rectifier, employing copper oxide or selenium type discs and organized to have an intermittent load rating sufficient to carry the switch machine power load, but it would be of insufficient capacity to supply such power if the load were continuous. Also, it should be understood that this rectifier would be unable to have applied thereto the full secondary voltage of the transformer 15 over a period of time, and for this reason the limiting resistor LR is normally included in the circuit. The back leakage current, which flows through the rectifier, causes a sufficient voltage drop in the resistor LR so that the normal voltage applied across the input terminals 26 and 27 of the rectifier unit R is considerably reduced over the operating voltage.

A protective relay PR is provided to be picked up when direct current is called for by the switch machine operating circuit, and when relay PR is picked up it closes its front contact 12 to shunt the resistor LR and allow full potential from the secondary of transformer 15 to be applied to the input terminals 26 and 27 of the rectifier unit R. This protective relay PR is provided with a lower winding H of relatively high resistance and a large number of turns and also with an upper winding L of low resistance and a relatively small number of turns. These windings of relay PR are normally connected in series in the operating circuit of the switch machine.

When the switch machine operating circuit requires power and is closed, sufficient current flows through the windings L and H in series from the output terminals 24 and 25 of the rectifier R, even though only a relatively low voltage is placed across the input of the rectifier, to cause the contacts of the relay PR to be picked up. As soon as front contact 11 of this relay PR is closed and shunts the high resistance winding H of the relay, the front contact 12 also shunts the limiting resistor LR so that operating current flows through the switch machine circuit to cause its operation. Such current in flowing through the low resistance winding L of the relay PR is sufficient to maintain the contacts 11 and 12 of this relay picked up. When the switch machine completes its operation and opens its operating circuit, the relay PR is deenergized and releases contacts 11 and 12.

In Fig. 2, the same general organization is provided, but the rectifier unit R has the secondary winding of the transformer 15 directly connected across its input terminals 26 and 27 without the limiting resistor of Fig. 1. The primary winding of the transformer 15 in this form is controlled by contacts 16 and 17 of the contactors CR and CN in multiple together with a back contact 18 of the overload device OL, so that energy is applied to the rectifier only when called for by the operation of the contactors CN and CR. However, should the switch machine stall in midstroke, and cause the overload device OL to be operated, back contact 18 would be opened and remove potential from the rectifier unit R.

It is believed that the nature of the invention, its advantages and characteristic features can be best understood with further description being set forth from the standpoint of operation.

*Operation of Fig. 1*

Let us assume that the operator moves the lever SML to its dotted line position calling for the reverse operation of the track switch TS. This causes energy to flow from the right hand portion of battery 19 through the lever SML in reverse position, back contact 20 of relay OL, winding of relay WZ, back contact 21 of relay OL, to the mid-tap of battery 19. Such energization of the relay WZ actuates its contact 9 to a left-hand position thereby unshunting the contactor CR, and closing a circuit for it in multiple with relay WZ. Thus, energy can flow from the right-hand terminal of relay WZ through movable contact 7 of the point detector contacts PD, winding of contactor CR, contact 9 of relay WZ in a left-hand position, to the left-hand terminal of the relay WZ, thus causing the energization of the contactor CR in multiple with the relay WZ.

The energization of the contactor CR causes its front contact 22 to be closed which allows the closure of back contact 23 of contactor CN by reason of the mechanical interlock above described. With these contacts 22 and 23 both closed, energy can flow from the output terminal 24 of the rectifier unit R, through front contact 22 of contactor CR, lower winding of overload device OL and resistor 10 in multiple, windings of the brake BR, motor field winding F, back contact 23 of contactor CN, motor armature A, lower winding H of relay PR, upper winding L of relay PR, to the other output terminal 25 of the rectifier unit R.

The current, which flows in this operating circuit for the switch machine is sufficient to cause the relay PR to close its front contacts 11 and 12, but of course does not operate the switch machine motor. The closure of front contact 12 shorts the limiting resistor LR by an obvious circuit, so that the full potential of the secondary of transformer 15 is applied to the input terminals 26 and 27 of the rectifier unit R. The closure of front contact 11 also shunts the high resistance winding H of the relay PR through an obvious circuit, so that the operating circuit of the switch machine is supplied with full direct current voltage from the output terminals 24 and 25 causing the release of the brake BR and the operation of the switch machine motor to effect the unlocking of the track switch TS and its operation to its reverse position.

During this reverse operation of the switch machine, the movable contacts 7 and 8 assume their intermediate positions as soon as the switch becomes unlocked, but it is noted that the circuit for the contactor CR is maintained closed. As soon as the movable arms 7 and 8 are operated to the reverse extreme positions upon the locking of the track switch in a reverse position, the circuit for the contactor CR is opened and its deenergization results in the opening of the switch of the switch machine operating circuit at contacts 22 and 23. Thus, the switch machine motor ceases operation and the relay PR is immediately released opening front contact 12 and reducing the applied potential to the input terminals 26 and 27 of the rectifier unit R.

Although the switch machine ordinarily operates properly from one extreme position to the other, it may happen that snow or ice, lumps of coal, or the like, will block the switch points and cause the stalling of the switch machine. In such an event, the current flowing through the lower winding of the overload device OL causes the movable contacts of this device to open back contacts 20 and 21. But as can be seen from the drawings these contacts are of the make-before-break type so that the upper winding of device OL is connected across the control wires through movable contact 28 before the relay WZ and contactor CN or CR are deenergized thus maintaining the device OL picked up through a stick circuit. It is noted that the current in the stick circuit for relay OL is always in the same direction as the direction of current flow through its lower winding for the particular normal or reverse operation then in progress. For example, in the above noted operating circuit the current flow is from right to left in the lower winding of the device OL, and if under such circumstances front contact 28 is closed, the lever SML being in a reverse position, current will flow from right to left in the upper stick winding of the overload device OL. This is so as to avoid a reversal in the direction of magnetic flux when the stick circuit becomes closed and thus prevent the momentary dropping of the armatures and the loss of the stick circuit.

In the event that the overload device OL becomes operated, such as during the reverse control of the switch machine SM as above described, then the movement of the lever SML to its normal position, causes the direction of current flow through the stick circuit of the device OL to be reversed, causing the reversal of magnetic flux in the device OL so that its armatures will drop away opening the stick circuit for its upper winding. Thus, the back contacts 20 and 21 are closed and the normal operation of the switch machine may be effected by the proper energization of the relay WZ and the corresponding circuit controller CN or CR.

The above reverse operation of the switch machine circuit has been described quite in detail for the purpose of pointing out that the load called for by such a switch machine circuit is of the intermittent type, and under the normal operations occurring in practice, the time that such load is called for will not exceed 3 to 10 seconds for example.

By way of example for an understanding of the advantages of the power supply organization provided in accordance with the present invention, it may be pointed out that the intermittent rating of the rectifier unit R may be an output of eight amperes of direct current at a potential of ninety volts for example. On the other hand, if such rectifier unit R were to be employed for a continuous load, it would normally be operated so as to supply a direct current potential of fifty volts and a direct current of eight tenths of an ampere. In comparing the voltage-amperes output under the two conditions, it will be seen that the intermittent rating is eighteen times as large as the continuous rating of the rectifier. With such a rated rectifier unit, it has been found that the limiting resistor LR may be in the order of four to five thousand ohms which thus acts to reduce the secondary potential of one hundred fifty volts applied to the input terminals 26 and 27 for operating the switch machine to approximately seventy-five volts while the limiting resistor is inserted with front contact 12 of relay PR opened. As above mentioned, the voltage drop between the secondary of the transformer 15 and the input terminals 26 and 27 is due to the back leakage of the rectifier units.

It is believed unnecessary to point out how the track switch may be controlled from its reversed position to its normal position since the operation will be readily understood by analogy to the operation already described.

Operation of Fig. 2

Since the switch machine control circuit of Fig. 2 is identical to the switch machine circuit of Fig. 1, the operation of the relay WZ, its associated contactors CN and CR together with overload device OL will not be discussed in detail, the description given in connection with Fig. 1 being directly applicable to this Fig. 2.

However, as above mentioned, the secondary winding of the transformer 15 is directly connected to the input terminals 26 and 27 of the rectifier unit R. But the primary winding of the transformer 15 is connected through contacts 16 and 17 of the contactors CR and CN in multiple which is in series with the back contact 18 of the overload device OL. Thus, assuming that the contactor CR is energized as above described for the reverse operation of the track switch TS, then front contact 16 is closed which supplies energy from the alternating current power line to the transformer 15 which in turn supplies alternating current to the input terminals 26 and 27 of the rectifier unit R. The output terminals 24 and 25 then supply energy to the operating circuit of the switch machine through contacts 22 and 23 in a manner directly analagous to the operating circuit above pointed out, which of course does not include a protective relay PR. As soon as the operation of the switch machine is completed, the contactor CR is deenergized and front contact 16 is opened, as well as the operating circuit for the contacts 22 and 23, so that the rectifier unit R is immediately deenergized. In the event that the overload device OL should be operated, the back contact 18 is opened causing the immediate deenergization of the transformer 15 and the rectifier unit R. In this way, the intermittent load is effective in supplying potential to the input terminals 26 and 27 of the rectifier unit R only when direct current is called for.

It is to be understood that the rectifier unit R is of the copper oxide dry plate type, or of the selenium dry plate type, or the like, and has a similar load rating and as described in connection with Fig. 1. In this form of the invention shown in Fig. 2, it is apparent that it is necessary to carry the alternating current power line to the contactors located in the switch machine which requires not only added contacts on such contactors, but also the hazard of short circuits occurring in the trunking or cable connecting the alternating current supply with the transformer 15 and thus undesirably energize the rectifier unit R when direct current power is not called for. On the other hand, the arrangement of the present invention as shown in Fig. 1 can be wholly located in a relay case and only the direct current wires carried to the switch machine. In such a case no added contacts are required nor added cable connections so that the organization can be supplied without any changes to the switch machine as a device.

Although Fig. 2 shows the contacts 16, 17 and 18 as controlling the primary of transformer 15, it is to be understood that these contacts can be included in the secondary circuit if desired.

Having thus described a power supply system for a power-operated track switch, or the like in two forms of the present invention, it is to be understood that many other forms of the invention may be made, and that various modifications, adaptations and the like are intended to be within the scope of the present invention as set forth and defined by the appended claims.

What I claim is:

1. In a direct current power supply system for intermittent loads, a source of alternating current, a rectifier unit having an alternating current input and a direct current output, a limiting resistor, circuit means connecting said alternating current to the input of the said rectifier through said limiting resistor, an intermittent load circuit connected to the output of said rectifier, and electro-responsive means energized by the output of said rectifier unit and acting automatically upon the closure of said load circuit to shunt said limiting resistor.

2. In a direct current power supply system for intermittent loads, a source of alternating current, a rectifier unit having an alternating current input and a direct current output, a limiting resistor, circuit means connecting said alternating current source to the input of said rectifier unit through said limiting resistor, a protective relay having a high resistance winding and a low resistance winding, an intermittent load circuit connected to the output of said rectifier unit through said high resistance and low resistance windings of said relays in series, and contact means operated by said protective relay for shunting said limiting resistor and said high resistance winding when said relay is picked up upon the requirement of direct current power by said load circuit.

3. In a traffic controlling system, a traffic controlling device intermittently operable to different positions by electric power in accordance with manual control, a source of alternating current, a rectifier unit having an intermittent load rating substantially greater than its continuous load rating, circuit means connecting the output of said rectifier unit to said traffic controlling device, a limiting resistor, circuit means connecting said alternating current source to the input of said rectifier through said limiting resistor, and electro-responsive means energized by said rectifier unit and acting automatically when said traffic controlling device is manually controlled to a different position to shunt said limiting resistor, whereby said rectifier unit is normally supplied with a relatively low alternating current potential but is supplied with a relatively high alternating current potential for supplying power for the intermittent operation of said traffic controlling device only when such power is required.

4. In a system for supplying direct current power to an intermittently operated power-driven device, a source of alternating current, a rectifier unit having an alternating current input and a direct current output, a limiting resistor, circuit means connecting said alternating current source to the input of said rectifier unit through said limiting resistor, a protective relay having a high resistance winding and a low resistance winding, an operating circuit for said power-driven device connected to the output of said rectifier unit through said high resistance and low resistance windings in series, contact means on said relay for shunting said high resistance winding and for shunting said limiting resistor when said relay is picked up, overload protective means associated with said power-driven device for opening said operating circuit upon the occurrence of an overload, and means for maintaining said overload device operated until manual control to cause a subsequent operation of said device, whereby the intermittent manual control of said device requires only an intermittent load on said rectifier unit even in the event of failure of the device to complete its operation.

5. In a system for the intermittent power operation of a direct current electrical device, a source of alternating current, a rectifier having input and output connections, rectifier input circuit means for directly connecting said source of alternating current to said rectifier input connections at a selected high or low potential, circuit means for intermittently connecting said device to said rectifier output connections, electro-responsive means connected to said rectifier output connections and energized when said low potential is applied to the input connections of said rectifier only when said device is connected by said circuit means, and circuit means for selecting said high potential for application by said rectifier input circuit means only when said electro-responsive means is energized.

6. In a system for the control of a two-position power driven device, manual control means having two positions, a source of alternating current, a rectifier having alternating current input and direct current output connections for energizing said device, normal and reverse pole changers for selecting the two positions of said device, circuit means for connecting said device to said direct current output connections of said rectifier through contacts of said pole changers so that said device is energized for operation only at times required to maintain correspondence with the respective positions of said manual control means, rectifier energization means for applying a selected high or low potential from said source of alternating current to said input connections of said rectifier, and electro-responsive means responsive when said low potential is applied to said rectifier and said device is connected to said rectifier to select said high potentials for said rectifier energization means.

7. In a remote control system for the power operation of a two-position device, two-position manually operable means at a control point, a source of alternating current and a rectifier and a power control relay at a central location separate from said device, correspondence contact means associated with said device, circuit means for connecting said source of alternating current to said device through said rectifier and said correspondence contact means when said device is out of correspondence with said manually operable means, means at said central location for energizing said power control relay when said device is connected to said rectifier by said circuit means, and means for restricting the potential applied by said alternating current source except when said power control relay is energized, irrespective of said correspondence contact means, whereby the control of said power control relay and its effect upon the alternating current supply to said rectifier is all provided at the point of location of said rectifier irrespective of other control means used for the intermittent control of said device.

CHARLES L. SWANTON.

REFERENCES CITED

The following references are of record in the file of this patent:

UNITED STATES PATENTS

| Number | Name | Date |
|---|---|---|
| 2,203,907 | Hines | June 11, 1940 |
| 2,006,997 | Lingal | July 2, 1935 |
| 1,883,693 | Gilson et al. | Oct. 18, 1932 |
| 2,156,689 | Hines | May 2, 1939 |
| 2,166,316 | O'Hagan | July 18, 1939 |
| 2,199,952 | Hines et al. | May 7, 1940 |
| 2,315,032 | Young | Mar. 30, 1943 |